Figures 1, 2:
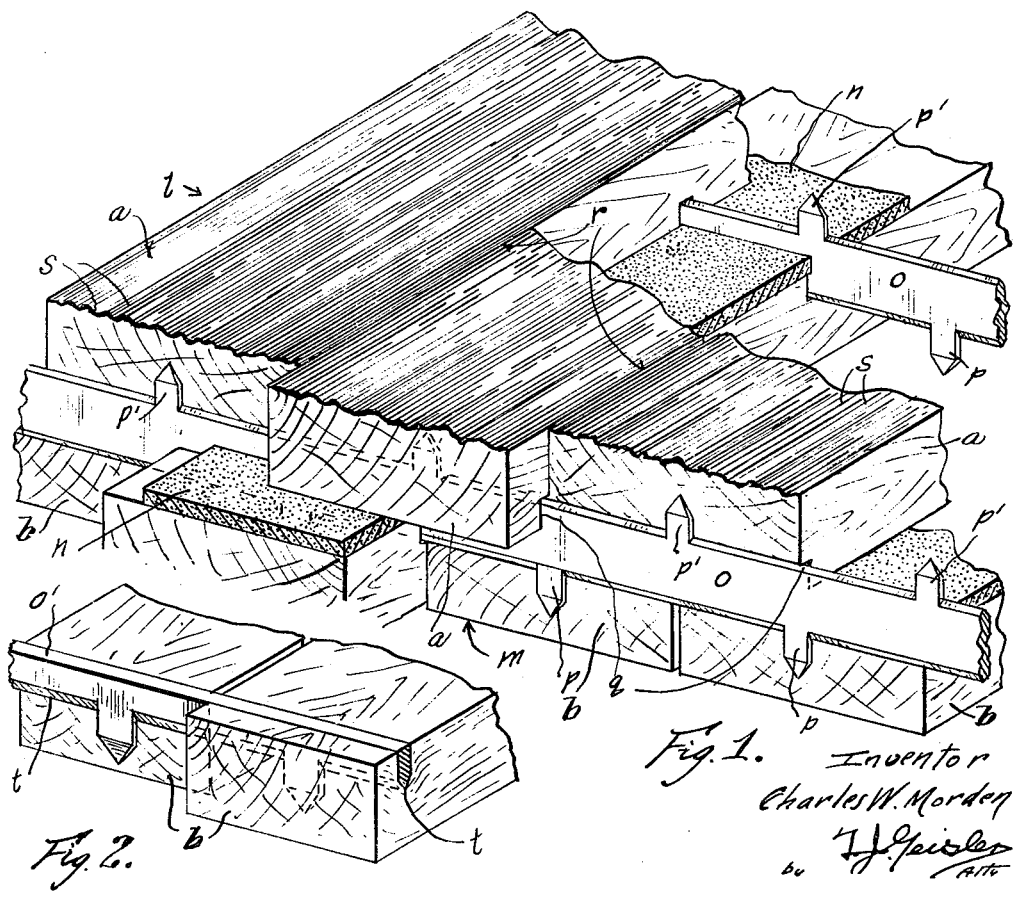

Aug. 19, 1930.   C. W. MORDEN   1,773,695
METHOD FOR CONCEALING THE VISIBILITY OF JOINTS IN COMPOSITE SURFACES

Original Filed Oct. 13, 1927

Inventor
Charles W. Morden
by J. J. Geisler
Atty

Patented Aug. 19, 1930

1,773,695

UNITED STATES PATENT OFFICE

CHARLES W. MORDEN, OF PORTLAND, OREGON

METHOD FOR CONCEALING THE VISIBILITY OF JOINTS IN COMPOSITE SURFACES

Application filed October 13, 1927, Serial No. 225,974. Renewed July 2, 1930.

My invention relates to composite boards. Since these boards are frequently used in paneling it is desirable that the crevices between the units be indiscernible and that the expansion and shrinkage cross-wise of the total width of the composite board be rendered negligible so as not to be noticeable.

Therefore, the principal object of my invention is so to treat the exposed face of my composite board as to conceal the crevices occasioned by the joints between adjacent units composing a layer or between adjacent boards, and to render such joints practically undiscernible.

A further object of my invention is to provide a composite board in which the factors of said shrinkage and expansion are reduced to a negligible quantity.

I attain these objects in a composite board composed of a plurality of assembled units arranged closely side by side, interconnecting the adjacent units by a material having a relatively negligible expansion and contraction caused by atmospheric changes, and producing additional false crevices in the exposed surfaces of said units, to blend with said joint crevices and thus producing a uniform surfacing of said units simulating in its effect a one piece structure; the said interconnecting material being covered by said units, whereby said interconnecting of the adjacent units functions to maintain the width of the joint crevices therebetween in harmony with said produced additional crevices, and the joint crevices are rendered practically indiscernible.

The details of carrying my invention into practice are illustrated more or less diagrammatically in the accompanying drawings, and hereinafter fully described.

In the drawings:

Fig. 1 illustrates one embodiment of my composite board constructed so as to permit expansion and contraction of its units without deformation of the board as a whole and in which the visibility of the crevices occasioned by the joints between the adjacent units composing a layer are rendered practically undiscernible.

And Fig. 2 illustrates a possible modification in the construction of one of my fastener elements.

Referring now to Fig. 1 this shows my composite board as composed of upper and lower layers $l$, $m$, between which is inserted an auxiliary layer $n$ of some material having the property of resisting fire or water, heat or cold.

The units $a$, $b$ of my composite board are fastened together by a flat strip of metal $o$, provided with points $p$ and $p'$ on its upper and lower edges. To accommodate this type of fastener the units may be grooved as indicated at $q$, thereby permitting the opposed faces of the units to be brought closely together or into contact with the intermediate layer, if such be used; the points $p$ and $p'$ being driven into the under sides of the units; thus fastening these in place on the fastener $o$. It is to be noted that the points $p$ and $p'$ are located so as to enter approximately the transverse center of the units, and thus permit an equal amount of expansion or shrinkage on either side of the point of fastening.

Instead of providing channels or grooves as $q$ in the opposed faces of the units $a$, $b$ in which to receive the fastener $o$, the latter may be made with sharp edges $t$ as illustrated by $o'$ in Fig. 2; said sharp edges being adapted to be driven into the faces of the units, by pressing the latter upon said fastener. In case of applying this fastener to a single layer of units, the fastener could be driven into the units so as to be flush with their exposed faces, as also illustrated by Fig. 4.

In order to produce a surface treatment of the exposed faces of the units so as to practically conceal the joint-crevices $r$ between the adjacent units, I produce in said exposed surfaces shallow channels or false crevices as to blend with the said joint crevices $r$, and in that way rendering the latter practically undiscernable. But it is further necessary to maintain the joint crevices in harmony with said false crevices to produce the desired effect of a one piece structure, and such effect can only be assured by interconnecting the units by members made of a material having negligible expansions and contractions due to atmospheric changes.

I claim:

1. The herein described method of concealing the visibility of joints between the units of a composite which consists in arranging a plurality of relatively narrow units closely side by side, and concealing the visibility of the crevices occasioned by the joints between the adjacent units by channeling the exposed surfaces of said units, thereby to produce additional crevices in said exposed surfaces, blending with said joint crevices thus tending to simulate graining and rendering the said joint crevices practically undiscernible.

2. The herein described method of concealing the visibility of joints between the units composing a composite board, which consists in channeling the exposed surfaces of said units to produce simulations of additional crevices in said surfaces, blending with said joint crevices, thereby to simulate graining in said surfaces and render said joint crevices practically undiscernible.

3. The herein described method of concealing the visibility of joints between the units composing a composite board, which consists in, arranging the units closely side by side and, channeling the exposed surfaces of said units to produce simulations of additional crevices in said surfaces blending with said joint crevices, thereby to simulate graining in said surfaces and render said joint crevices practically undiscernible.

4. The herein described method of concealing the visibility of joint crevices between the units composing a composite surface, which consists in channeling the exposed surfaces of said units to produce additional crevices therein blending with said joint-crevices, whereby to render the latter crevices practically undiscernible, and produce a surface simulating an integral one-piece structure.

CHARLES W. MORDEN.

DISCLAIMER 1,773,695. *Charles W. Morden*, Portland, Oreg. METHOD FOR CONCEALING THE VISIBILITY OF JOINTS IN COMPOSITE SURFACES. Patent dated August 19, 1930. Disclaimer filed May 13, 1942, by the assignee, *Mastic Asphalt Corporation*.

Hereby enters this disclaimer to claims 2 and 4 of said Letters Patent.

[*Official Gazette June 16, 1942.*]